US007572976B1

(12) United States Patent
Merrill

(10) Patent No.: US 7,572,976 B1
(45) Date of Patent: Aug. 11, 2009

(54) QUICK CONNECT ELECTRICAL BOX

(76) Inventor: Victor Merrill, 1601 Buttermilk West, Prescott, AZ (US) 86305

( * ) Notice: Subject to any disclaimer, the term of this patent is extended or adjusted under 35 U.S.C. 154(b) by 0 days.

(21) Appl. No.: 12/069,154

(22) Filed: Feb. 6, 2008

(51) Int. Cl.
*H02G 3/08* (2006.01)

(52) U.S. Cl. ......................... 174/50; 174/17 R; 174/58; 174/60; 174/63; 174/64; 174/481; 248/906; 439/535; 361/600

(58) Field of Classification Search ............... 174/17 R, 174/50, 58, 59, 60, 63, 64, 481; 248/906; 439/535; 220/4.02; 361/600
See application file for complete search history.

(56) References Cited

U.S. PATENT DOCUMENTS

| | | | | |
|---|---|---|---|---|
| 2,410,287 | A | 10/1946 | Jaberg | |
| 2,426,235 | A | 8/1947 | O'Brien et al. | |
| 2,912,526 | A | 11/1959 | Herrmann et al. | |
| 3,038,141 | A | 6/1962 | Chiuchiolo | |
| 3,263,131 | A | 7/1966 | Rowe | |
| 3,814,834 | A | 6/1974 | Glader | |
| 3,922,478 | A | 11/1975 | Perkey | |
| 4,336,418 | A | 6/1982 | Hoag | |
| 4,607,906 | A | 8/1986 | Munroe | |
| 4,627,675 | A | 12/1986 | Taylor et al. | |
| 5,399,806 | A | 3/1995 | Olson | |
| 5,526,225 | A | 6/1996 | Wang | |
| 5,670,743 | A | 9/1997 | Welch et al. | |
| 6,259,023 | B1 | 7/2001 | Reiker | |
| 6,476,319 | B1 * | 11/2002 | Shemtov | 174/659 |
| 6,563,049 | B2 | 5/2003 | May | |
| 6,575,777 | B2 | 6/2003 | Henriott et al. | |
| 6,839,244 | B1 * | 1/2005 | Rood | 361/826 |
| 6,852,923 | B2 * | 2/2005 | Perry et al. | 174/50 |
| 6,933,441 | B2 * | 8/2005 | Fuller et al. | 174/50 |
| 6,939,180 | B1 | 9/2005 | Wu | |
| 7,022,912 | B1 * | 4/2006 | Kilburn | 174/50 |
| 7,122,738 | B2 * | 10/2006 | Kanamaru | 174/50 |

* cited by examiner

*Primary Examiner*—Dhiru R Patel
(74) *Attorney, Agent, or Firm*—Gallagher & Kennedy, P.A.; Andrea NIcholson

(57) ABSTRACT

There is provided a quick connect electrical box assembly that can be attached to a construction member such as a wall stud. The electrical box includes a box frame and a box back. The box frame and box back each include reciprocal snap connectors so that the frame can be joined to the back. Channels are configured in the box back, and conductor rails are positioned in these rails. Common electrical wires, such as are founded in three-strand bundled power lines, can be stripped of their insulation and placed in the rails. The rails, formed of conductive material such as copper, then form an electrical connection within the box. Using this box an electrician can quickly and efficiently bring power to a location during rough assembly. Later, during finish electrical work, the electrician can also plug devices such as switches and plugs into the box. The switches and plugs, configured with prongs, make electrical connection with the rails and thereby receive power. The electrical box thus offers improved construction efficiency.

26 Claims, 11 Drawing Sheets

QUICK CONNECT ELECTRICAL BOX

FIELD OF THE INVENTION

The present invention relates to electrical wiring and construction methods related to electrical wiring. More particularly the present invention relates to a quick connect electrical box that can accelerate construction methods and provide versatility in application.

BACKGROUND OF THE INVENTION

During construction, both residential and commercial, an electrician will typically feed wires, such as a ROMEX® three wire power cable, from a power source (a breaker box for example in home construction) through the building to various end points and junction points such as switches, receptacles, and fixtures. Per National Electric Code (NEC), and other codes, the terminal points or junction points typically receive the three strand wire in an electrical box. Within such an electrical box different wires are joined so as to create electrical connections. Thus, for example, a supply wire brings power to a switch, and an outgoing wire from the switch leads to an electrical element such as a light fixture. Following the presently known methods of construction, an electrician can spend a significant amount of time in making the wire connections held within an electrical box. Wires must be individually stripped and joined, typically using wire nuts. Good electrical practice may call for an electrician to "pig tail" individual wires; i.e., joining common wire groups (power, return, and ground) in a common wire nut and leading a shorter wire "pig tail" to a switch or plug. This is a time consuming operation. It would be desired to provide construction means and methods that would allow the electrician to accelerate electrical wiring so as to achieve a time and labor savings.

Additionally, poor or substandard wire connections within an electrical box lead to a significant amount of inspection failures. When an electrical job receives an inspection failure, the electrician is generally required to return to the job side and devote additional construction time to correct the failure. It is desired to provide construction means and methods to minimize such failures. Further, the joining of electrical wires requires a certain level of skill and talent that is difficult for some individuals to achieve, and such junior electricians may encounter a higher degree of inspection failure. Thus, it would further be desired to provide construction means and methods that allow for an improved, robust electrical connection that can be more easily obtained, even for individuals of moderate skill, than present construction methods.

It would generally be desired that any improvement in electrical wiring construction be relatively inexpensive, compared to other alternatives. And further, it would be desired that improvements could be retrofit with existing equipment and applied to existing wiring configurations.

Hence there has been identified a need to provide an improved method and means for making electrical connections. It would be desired to provide an improved electrical box that could be used in both residential and commercial applications. It would further be desired to provide a quick connection electrical box that, while strong and robust in structure, can be retrofit into existing structures and wiring configurations. It is further desired to provide an improved electrical box that saves installation time for an electrician while minimizing the risk of inspection failures. The present invention addresses one or more of these needs.

SUMMARY OF THE INVENTION

In accordance with one aspect of the present invention, and by way of example only, there is provided a quick connect electrical box assembly that can be attached to a construction member such as a wall stud. The electrical box includes a box frame and a box back. The box frame and box back each include reciprocal snap connectors so that the frame can be joined to the back. Channels are configured in the box back, and conductor rails are positioned in these rails. Common electrical wires, such as are founded in three-strand bundled power lines, can be stripped of their insulation and placed in the rails. The rails, formed of conductive material such as copper, then form an electrical connection within the box. Using this box an electrician can quickly and efficiently bring power to a location during rough assembly. Later, during finish electrical work, the electrician can also plug devices such as switches and plugs into the box. The switches and plugs, configured with prongs, make electrical connection with the rails and thereby receive power. The electrical box thus offers improved construction efficiency.

In another aspect of the present invention, still by way of example only, there is provided an assembly for connecting electrical cables that comprises a first length of three strand cable having a positive wire, a neutral wire, and a ground wire, and each of the positive wire, neutral wire, and ground wire having an insulated portion and a bare portion; a transfer electrical box having a box back and a box frame, and the transfer electrical box having three channels positioned on a back of the transfer electrical box, and a conducting rail disposed in each channel; wherein an exposed positive wire from the first length of three strand cable is secured in a first rail of the transfer electrical box, an exposed neutral wire from the first length of three strand cable is secured in a second rail of the transfer electrical box, and an exposed ground wire from the three strand cable is secured in a third rail of the transfer electrical box; a second length of four strand cable having a first end and a second end, and having a first positive wire, a second positive wire, a neutral wire, and a ground wire; wherein an exposed first end of the first positive wire of the second length of four strand cable is disposed within the same conducting rail that the exposed positive wire from the first length of three strand cable is disposed; wherein an exposed first end of the second positive wire of the second length of four strand wire is disposed within the same conducting rail that the exposed positive wire from the first length of three strand cable is disposed; wherein an exposed first end of the neutral wire of the second length of four strand cable is disposed within the same conducting rail that the exposed neutral wire from the first length of three strand cable is disposed; wherein an exposed first end of the ground wire from the second length of four strand cable is disposed within the same conducting rail that the exposed ground wire from the first length of three strand cable is disposed; a terminal electrical box having a box back connected to a box frame, and the terminal electrical box having three channels with three conducting rails positioned in the box back; wherein an exposed second end of the first positive wire of the second length of four strand cable and an exposed second end of the second positive wire of the second length of four strand cable are disposed in the same first conducting rail of the terminal electrical box; wherein an exposed second end of the neutral wire of the second length of four strand cable is disposed within a second conducting rail of the terminal electrical box; wherein an exposed second end of the ground wire of the second length of four strand cable is disposed within a third conducting rail of the terminal electrical box; and such that the power rail of the transfer electrical box is in electrical communication with the power rail of the terminal electrical box, the neutral rail of the transfer electrical box is in electrical communication with the neutral rail of the terminal electrical box, and the ground rail of the transfer electrical box is in electrical communication with the neutral rail of the terminal electrical box.

Other independent features and advantages of the quick connect electrical box will become apparent from the following detailed description, taken in conjunction with the accompanying drawings which illustrate, by way of example, the principles of the invention.

LIST OF REFERENCE NUMERALS

Figure 1:
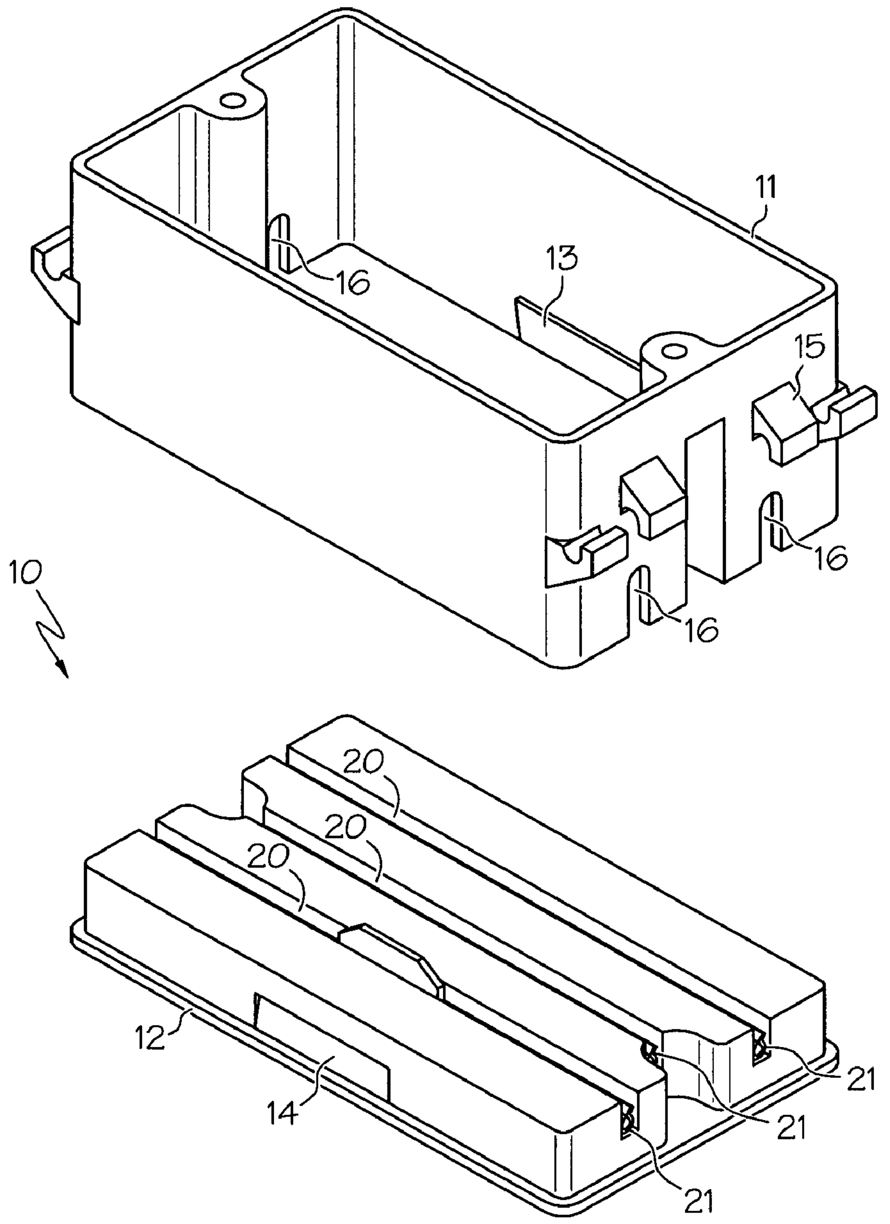
FIG. 1 is an exploded view of a quick connect electrical box, according to an embodiment of the present invention.

Wherever possibly, the same reference numbers will be used throughout the drawings to refer to the same or like parts. The following provides a summary of reference numbers and structure associated therewith, unless the context of the description indicates otherwise.

10 electrical box assembly
11 box frame
12 box back
13 frame snap connector
14 back snap connector
15 nail guide
16 wire cutaway
20 channel
21 conductor rails
22 conductor rail top
23 conductor rail holding area
24 ROMEX® wire
25 sheathing
26 wire strand
27 bare wire
28 wire insulation
30 jump tab
31 positive wire
32 negative wire
33 ground wire
40 switch insert
41 prong
42 face plate
43 screw
44 switch body
47 securing screw
50 transfer electrical box
51 terminal electrical box
61 blue wire
62 black wire
101 rail block
103 support
104 legs
105 tape
107 rail surface
108 finger recess
109 friction connector
110 plastic box
120 receptacle
130 double box
140 light box
142 light insert

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings.

Referring initially to FIG. 1 there is shown a preferred embodiment of a quick connect electrical box 10. Components of box 10 include box frame 11 and box back 12. Box frame 11 and box back 12 can further include reciprocally matching snap connectors so that, by manual hand pressure, box back 12 can be attached to box frame 11. Thus, box frame 11 may include a frame snap connector or first connector 13, and box back 12 may include a perimeter for adjoining the box frame walls, having a back snap connector 14 or second snap connector. When snapped together, box frame 11 and box back 12 form a quick connect electrical box or assembly 10. Box frame 11 may additionally have wire cutaways 16, areas of removed material, through which wires may pass through box frame 11, even when assembled with box back, as further described herein. It will be appreciated that the overall dimensions of box 10 can vary. However, it is generally preferred that the dimensions closely match the dimensions commonly specified for electrical box applications by various construction codes such as, for example, the National Electrical Code (NEC). Similarly, as for materials, box frame 11 and box back 12 can be manufactured of a variety of materials, including for example metal alloys and plastics, and it is generally desired that the materials selected be approved materials for electrical box construction under the NEC.

It is further noted that the electrical box assembly 10 can include features that are commonly associated with electrical box usage. For example, assembly 10 can include a nail guide 15. Nail guide 15 comprises a set of structures or protrusions through which a nail (or other fastener) can be guided so that the nail can then be driven into a stud (or other structure) thereby securing assembly 10 to the stud.

Figure 2:
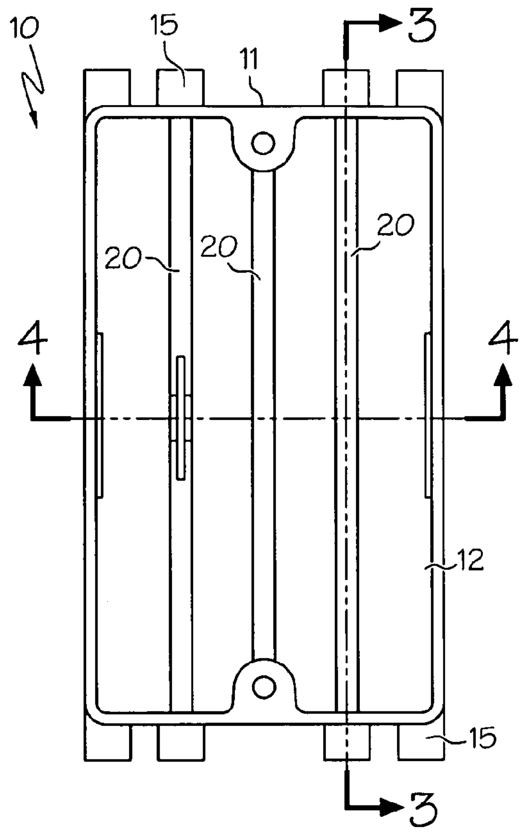
FIG. 2 is a top view of a quick connect electrical box, according to an embodiment of the present invention.
Figure 3:
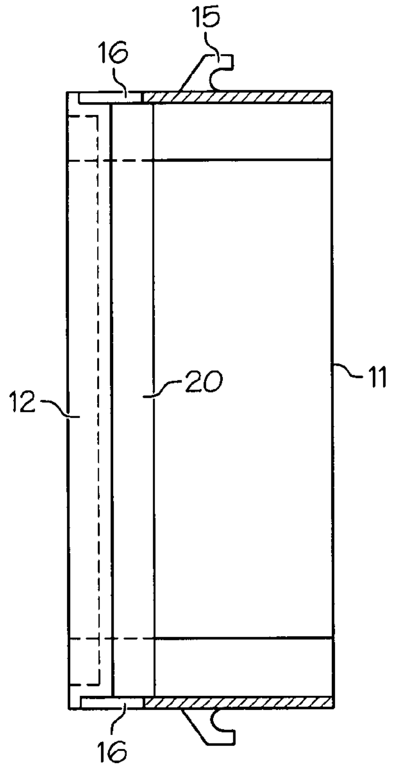
FIG. 3 is a side view of a quick connect electrical box, according to an embodiment of the present invention.
Figure 4:
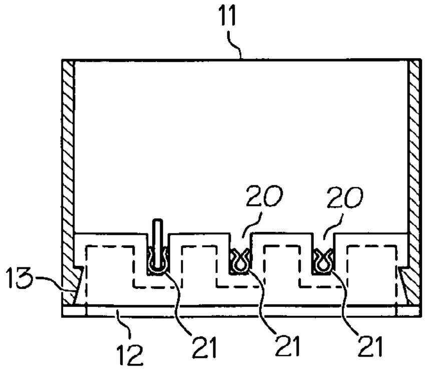
FIG. 4 is a cut away view of a quick connect electrical box, according to an embodiment of the present invention.

Referring again to the box back 12 as illustrated in FIGS. 1, 2, and 4, box back 12 includes a plurality of channels 20. Conductor rails 21 are disposed within channels 20. While any number of channels 20 can be created in box back 12, it is preferred to provide three such channels 20 corresponding to positive, negative, and ground wires, as explained further herein. As best illustrated in FIG. 2, conductor rail 21 can be a single continuous piece; optionally, conductor rail 21 may comprise two pieces with a break or discontinuity between the pieces. The two piece conductor rail configuration is advantageously used, as described further herein, with plugs or switches to wire boxes with a desired result. The conductor rail 21 is preferably fabricated of known electrical conducting material such as copper, aluminum, and alloys of each. The length of channel 20 preferably runs completely from the first edge to the opposite edge of box back 12.

Figure 5:
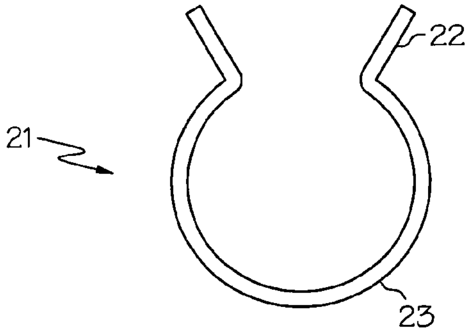
FIG. 5 is a cross sectional view of a conductor rail, according to an embodiment of the present invention.

Referring next to FIG. 5 there is shown a close up cut away view of a preferred embodiment of conductor rail 21. Specifically it is shown that conductor rail 21 includes a top structure 22 and a holding area 23. Top 22 may generally consist of short walls set along opposing sides of conductor rail 21 to form a v-shaped area. Top 22 is dimensioned so as to receive common grades of exposed electrical wire. Holding area 23 is dimensioned so as firmly to hold in place common grades of exposed electrical wire. Preferably conductor rail 21 has a degree of resiliency in that an exposed wire can first be aligned lengthwise along top 22, finger pressure acting on the wire can then press the wire past top 22 and into holding area 23. Further, top 22 is dimensioned so that once a wire passes top 23 and moves into holding area 23, top 23 snaps back to its original position thereby holding wire within holding area 23.

Figure 6:
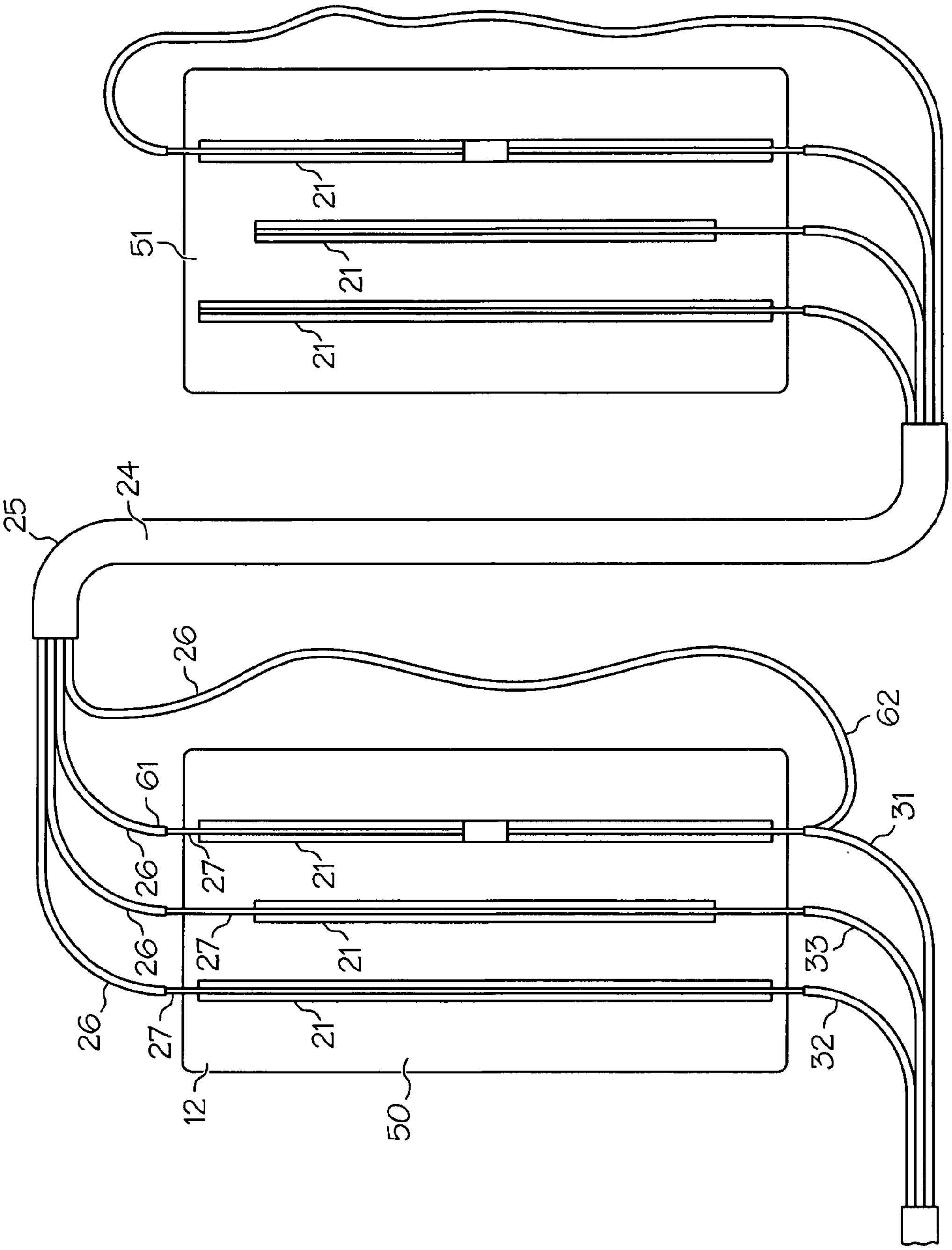
FIG. 6 is a schematic view of ROMEX® wire connected to electrical boxes, according to an embodiment of the present invention.

Referring next to FIG. 6, there is illustrated a wire connection between a transfer electrical box 50 and terminal electrical box 51. Power is brought initially into first electrical box 50 through Romex® wire 24. Wire 24 typically includes three individual wire strands 26, a positive wire 31, negative wire 32, and ground wire 33. Each wire strand 26 is positioned in a separate conductor rail 21. Thus, when electric current is sent through positive wire 31, that current also passes into current rail 21 and electrically activates that rail. Any wire 26 which may also be attached to rail 21 will receive that electrical charge. In a similar manner, neutral wire 32 may be attached to a rail 21, and ground wire 33 may be attached to a rail. Preferably each of these wires, neutral wire 32 and ground wire 33, would be in electrical contact with the rail so as to send and receive charge through the rail 21 to which each is attached. FIG. 6 also illustrates the preferred embodiment in which positive wire 31 and neutral wire 32 are connected at opposite ends of box back 12, so as to maximally separate these wires, and ground wire 33 is positioned in the middle.

Figure 7:
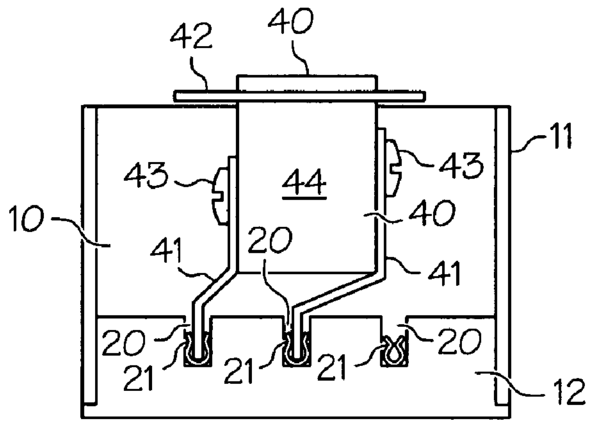
FIG. 7 is a cutaway view of an electrical box and switch insert, according to an embodiment of the present invention.
Figure 8:
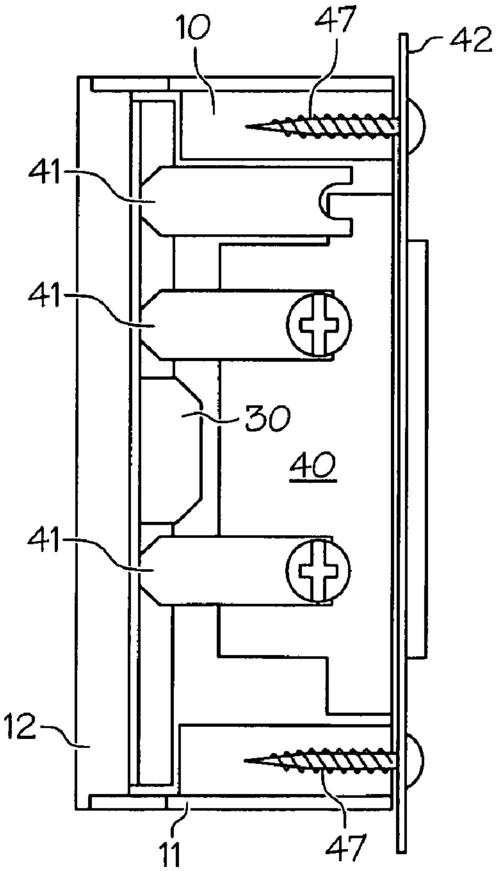
FIG. 8 is a further cutaway view of an electrical box and switch insert, according to an embodiment of the present invention.

FIG. 6 further illustrates a second length of multi-strand wire, such as Romex® wire 24, a four strand wire. As is known in the art, such a four strand wire 24 may include two positive wires, typically colored blue and black, which may be used for example to activate a ceiling fan in the configuration where black powers the fan and blue powers the lighting (or vice versa). As shown in FIG. 6 the blue 61 and black 62 wires may be attached to the same rail 21. In this manner power may be brought to transfer box 50 through a first positive wire 31, and that power can then be transferred to blue wire 61 and black wire 62. which in turn carries the power to terminal box 51. Blue wire 61 and black wire 62 are similarly connected at opposite ends of the same rail 21 at terminal box 51. Similarly, neutral and ground connections can transfer electrical charge between transfer box 50 and terminal box 51 through Referring next to FIGS. 7 and 8 there is shown a switch insert 40 coupled with a electrical box assembly 10. Switch insert 40 further includes switch body 44 with face plate 42 attached thereto. Switch body 44 further may have prongs 41 attached thereto by screws 43. While in a preferred embodiment, screws 43 are used to attach prongs 41, other attachment means may be used such as clipping, soldering, and other means known in the art. Prongs 41 are advantageously configured and sized so that prongs 41 can mate with rails 21. Further, when as shown in FIG. 8, three prongs 41 are present, each prong 41 can connect with a different rail 21. Additionally, prongs 41 and rails 21 are preferably sized so that when prongs 41 are inserted into rails 21, the prongs 41 are securely held in place, and thus switch insert 40 is likewise held in position relative to box assembly 10. Additionally, switch insert 40 can be secured to box assembly 10 with securing screws 47 as also shown in FIG. 8. Securing screws 47 may comprise a steeply pitched screw type for securing in a plastic receiving area (not shown). Prongs 41 are preferably made of a conductive material, such as copper or copper alloy, so as to transfer electrical current to and from rails 21. Switch insert 40 is preferably sized so that when switch insert 40 is fully secured to box assembly (so that prongs 41 have fully seated and contacted rails 21) face plate 42 of switch insert 40 is aligned with the top edge of box frame 11. In this way when a box assembly 10 and switch insert 40 is secured in a building wall, a decorative cover (not shown) can then be positioned over these items so as to hide them from view. This is further advantageous in that, during construction, a builder need only align box assembly 10 such that the top edge thereof is at a desired location, for example with respect to a stud or a sheet rock edge, and the builder can then secure the box assembly 10 knowing that a switch insert 41, which may be later attached, will align with box assembly 10.

Switch insert 40 may comprise internal hardware, conductors, and configuration (not shown) so as to render the switch insert 40 functional as, for example, a power switch. In an alternative embodiment, insert 40 may comprise receptacles for receiving standard power cables so as to provide the functionality for an electrical wall plug. In both cases, prongs 41 serve to transfer electrical current to and from rails 21 and the switch insert body 44. Thus, in a preferred embodiment, a switch insert 40 includes three prongs 41 corresponding to positive, neutral, and ground rails 21. It will also be appreciated that wires, which are not shown in FIGS. 7 and 8, can also be present to add to an electrical circuit.

Figure 9:
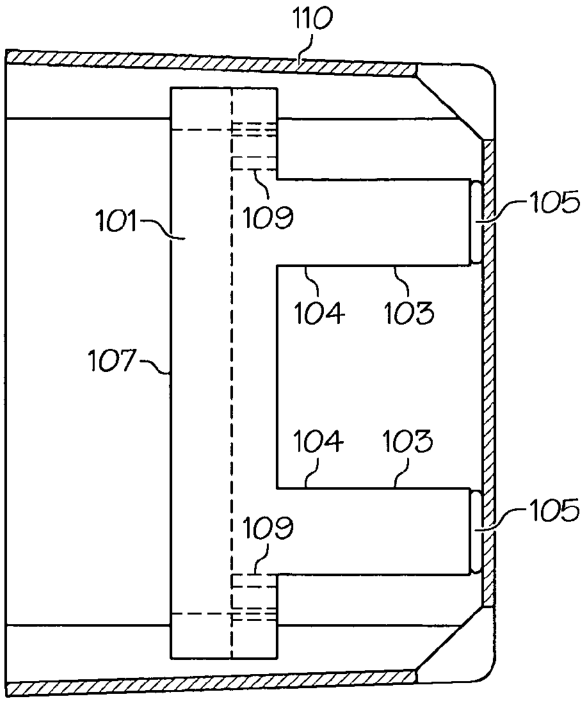
FIG. 9 is a side cutaway view of a rail block positioned in a plastic electrical box, according to an embodiment of the present invention.
Figure 10:
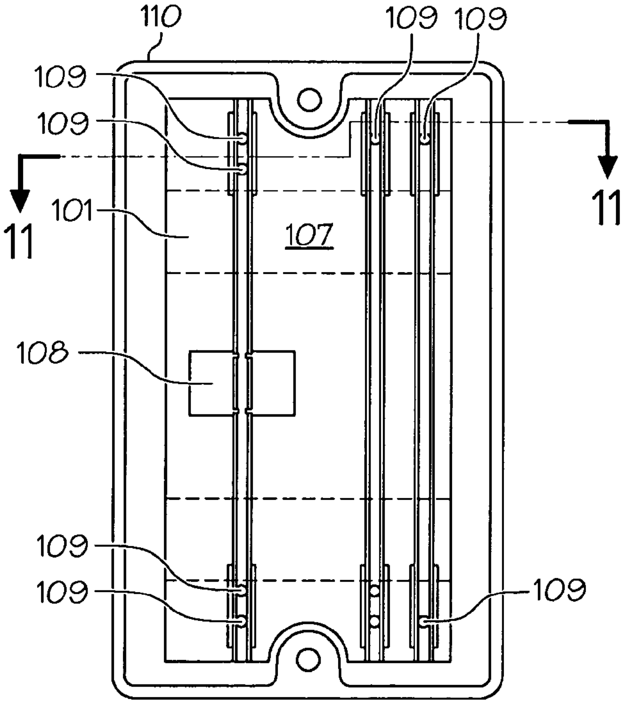
FIG. 10 is a plan view of a rail block positioned in a plastic electrical box, according to an embodiment of the present invention.
Figure 11:
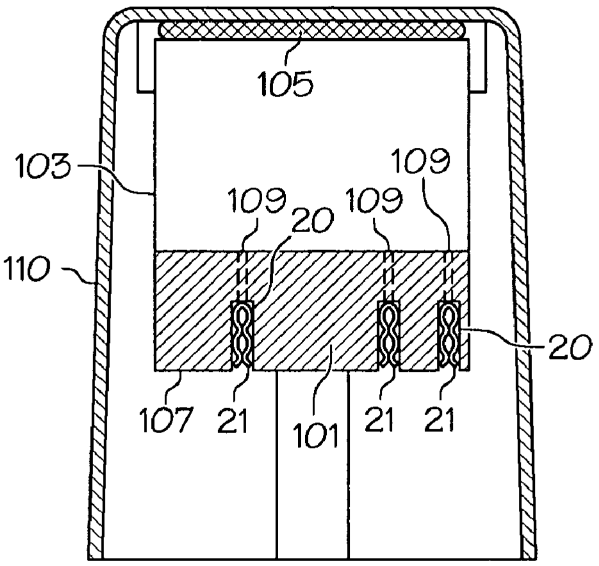
FIG. 11 is a top cutaway view of a rail block positioned in a plastic electrical box, according to an embodiment of the present invention.

Referring next to FIGS. 9,10, and 11 there is shown an embodiment of a rail block 101 which can also be used as described herein to accelerate electrical connections. Rail block 101 is preferably sized so as to fit within a standard electrical junction box, such as an 18 cubic inch plastic box 110. In one embodiment rail block 101 includes a support structure 103, such as legs 104. Legs 104 are preferably sized so as to contact the bottom of box 102, where rail block 101 can be held in place as by an existing means such as double sided foam tape 105. Other kinds of connections are possible. Rail block 101 further includes rail surface 107 which acts as a structure within which channels 20 and conductor rails 21 can be positioned. FIGS. 9, 10, and 11 further illustrate a preferred embodiment in which two conductor rails 21 are separated from a third conductor rail 21, and this is done in order to provide physical separation between the hot/power rail and the neutral and ground rails. It is also noted that legs 104 are a preferred support structure for material savings; however, other kinds of support structure 103, such as honeycomb shapes are possible to provide the needed elevation for rail surface 107 from the box bottom. FIG. 10 also demonstrates a finger recess 108 positioned in rail surface 107. Finger recess 108 allows a user's fingers to easily access jump tab 30.

FIG. 9 further illustrates an advantageous structure for connecting a stripped wire with conductor rail 21. Rail block 101 is fitted with friction connectors 109 known in the art. A bare wire is fed into friction connector 109, and the connector 109 both holds the wire in place and makes an electrical connection with the wire. Friction connectors 109 further make electrical connection with conductor rails 21. Friction connectors 109 can be positioned in various locations, and multiple friction connectors 109 can be positioned along the same conductor rail 21. In this manner one friction connector 109 can make an electrical connection at a first end of conductor rail 21, electricity can pass through conductor rail 21, and then a second wire can be connected at the opposite end of conductor rail 21 to pick up and pass on the electrical connection.

The rail block 101 shown in FIGS. 9, 10, and 11 is useful in hastening and improving existing construction methods. During rough construction the plastic box 110 can be affixed to a wall stud. Wires can be run to box and left in an unassembled form. Then, perhaps during a later phase of construction, wire attachments can be made. At this time an electrician can make electrical connections to a rail block 101. The rail block 101 can then be inserted into plastic box 110. If desired plastic box 110 can be covered, or as further described below, a switch cover can be applied over plastic box 110.

Figure 12:
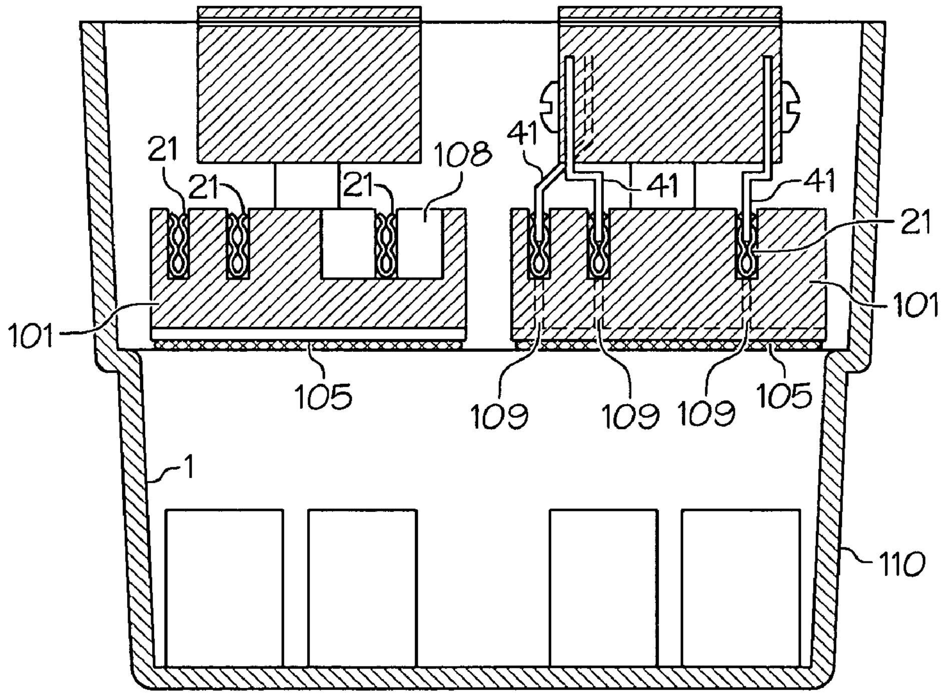
FIG. 12 is a top cutaway view of a double rail block with switch insert positioned in a double plastic electrical box, according to an embodiment of the present invention.
Figure 13:
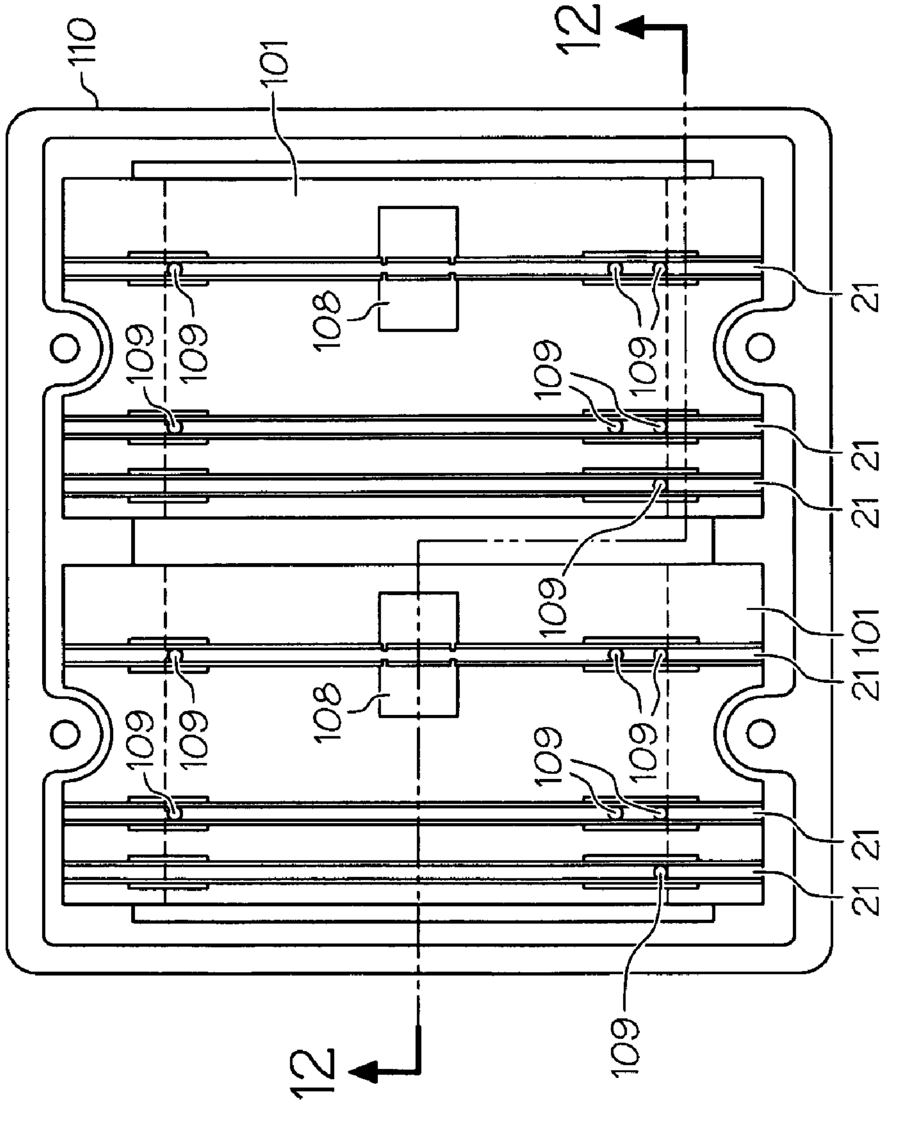
FIG. 13 is a plan view of a double rail block with switch insert positioned in a double plastic electrical box, according to an embodiment of the present invention.
Figure 14:
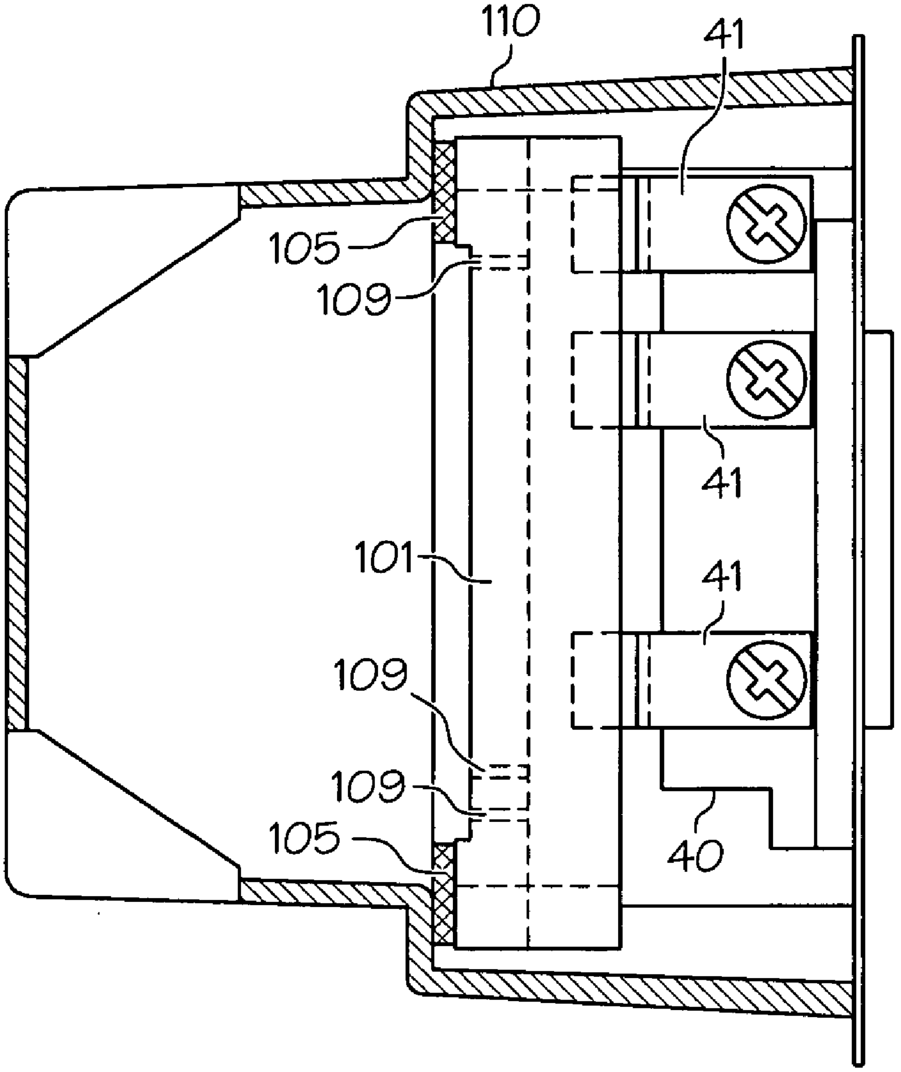
FIG. 14 is a side cutaway view of a double rail block with switch insert positioned in a double plastic electrical box, according to an embodiment of the present invention.
Figure 15B:
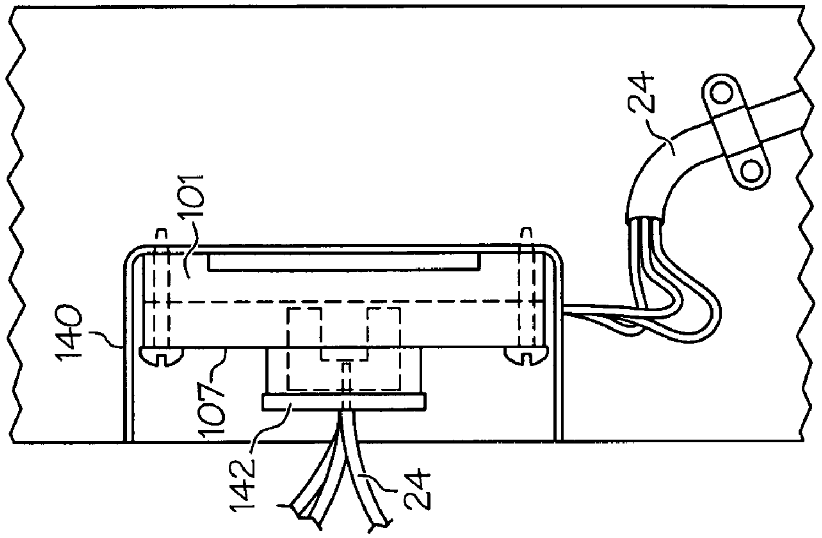
FIG. 15B is a side cutaway view of the assembly shown in FIG. 15A.
Figure 15A:
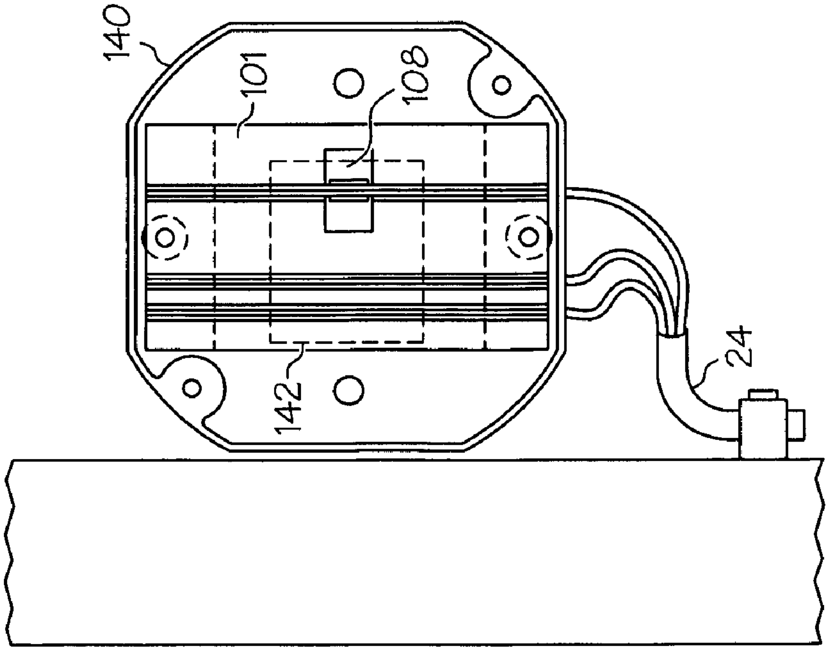
FIG. 15A is a plan view of an electrical box with insert, showing an embodiment of the present invention.
Figure 15D:
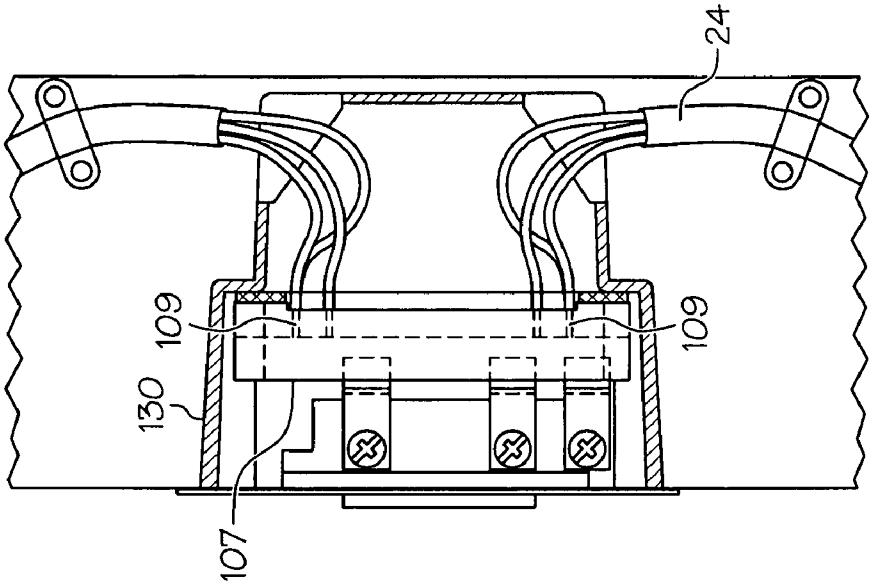
FIG. 15D is a side cutaway view of the assembly shown in FIG. 15C.
Figure 15C:
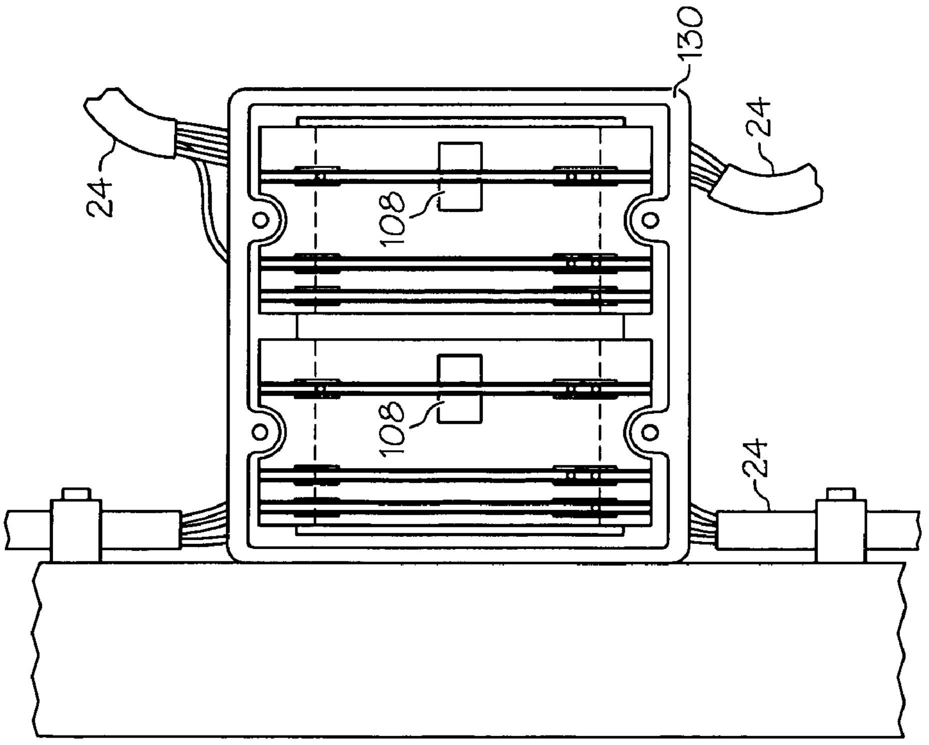
FIG. 15C is a plan view of an electrical box with dual inserts, showing an embodiment of the present invention.
Figure 15F:
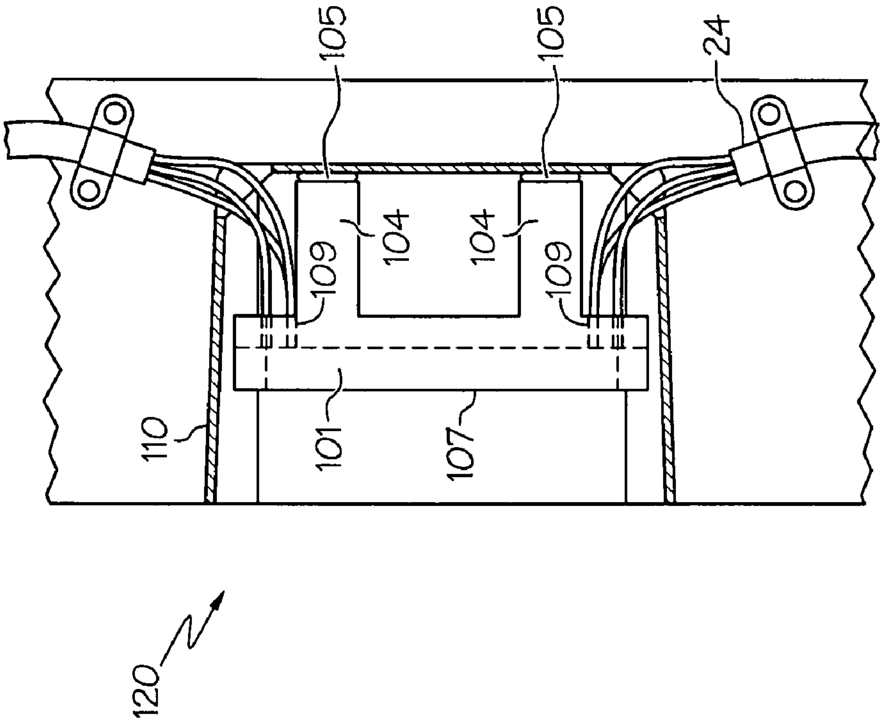
FIG. 15F is a side cutaway view of the assembly shown in FIG. 15E.
Figure 15E:
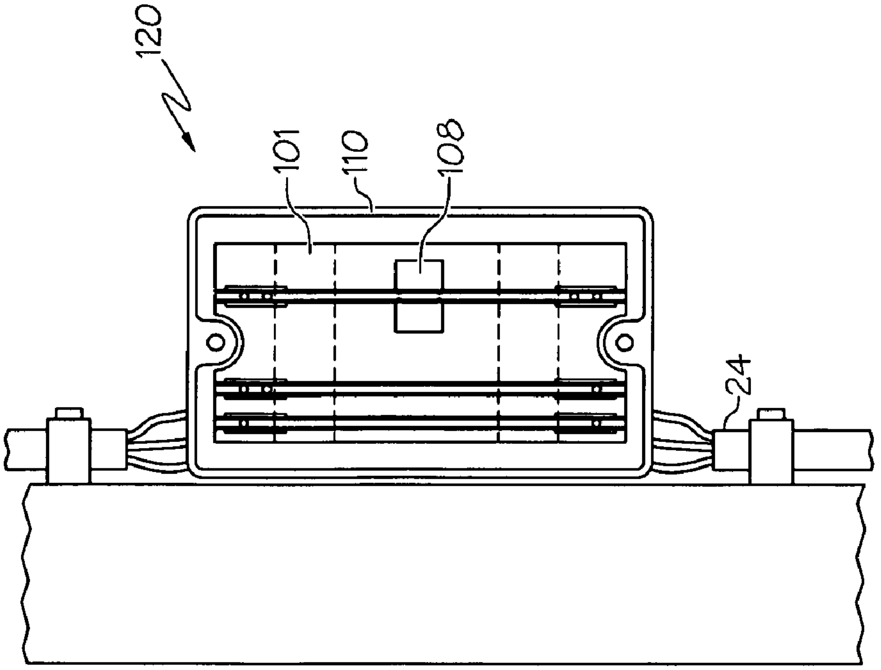
FIG. 15E is a plan view of a further electrical box with an insert, showing an embodiment of the present invention.

Referring next to FIGS. 12, 13, and 14, there is illustrated an assembly including both rail block 101 and switch insert 40. The illustrated embodiment also shows how two rail blocks 101 can be used in a double box along with two switch inserts 40. It is noted that prongs 41 are shaped and retrofit so as to provide an electrical connection between existing switch insert 40 and conductor rails 21. Such an embodiment is advantageously used with a double switch so that a switch cover plate would be used to cover box 110.

The structure and embodiments shown in FIGS. 9 through 14 are further illustrated in a combined application shown in FIGS. 15A through 15F. In this embodiment, three-strand wire brings power into a bottom box configured as a receptacle 120. In the receptacle 120 embodiment a box 110 is fitted with a rail block 101. Rail block 101 receives a receptacle insert. A receptacle cover (not shown) covers rail block 101, insert, and box 110 such that a standard three-pronged plug can be inserted into receptacle 110. It is noted that a second three-strand wire extends upward from receptacle 120 and brings power to double switch 130. It is further noted that in both three-strand wires the individual wires are connected to rail block 101 through friction connectors 109. Within double switch 130, the wire is connected to a lower position of rail block 101. A switch insert is connected to rail block, and a switch cover should be used. A further three strand wire is again connected to an upper position of switch. The wire connected to the upper position of switch 130 can proceed to a light box 140. Light box 140 can include a rail block 101 and a light insert 142. Light insert 142 is configured so as to provide pronged connectors with which to connect with rail block 101 in the manner that other inserts connect. However, light insert 142 also includes friction connections 109 with which to receive wires from a light fixture (not shown). The light fixture can then be attached to and hung from box 110 in the standard fashion.

Having described electrical box assembly 10 from a structural standpoint, a method of using assembly 10 will now be described. Individual wires from a strand of ROMEX® wire are first freed from the outer casing and insulation is trimmed to expose a short length of bare wire. The bare wire is then placed within a conductor rail 21 of box back 12. Preferably the conductor rail 21 is sized so that a wire can be placed lengthwise along the top 22 of conductor rail 21 and then snapped into the holding area 23 of conductor rail 21. If desired, opposing strands of wire can be similarly attached from the opposing end of box back 12. And, if desired, jump tab 30 can be inserted into one or more conductor rails 21. Once the wire attachments to box back 12 have been assembled in a desired fashion, box back 12 can be affixed to a box frame 11 thereby creating electrical box assembly 10. At this time, assembly 10 can be secured, for example to a wall stud, for example by aligning a nail through nail guide 15 and driving the nail into the stud.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A quick connect electrical box assembly for receiving electrical wires comprising:

a box frame defining walls and having a first snap connector;

a box back having a perimeter for adjoining the box frame walls and a second snap connector configured to attach to the first snap connector so as to form an electrical box assembly;

a plurality of channels configured in the box back; and a plurality of conductor rails disposed in the channels, the conductor rails configured to receive and hold electrical wires.

2. The electrical box according to claim 1 wherein each of said conductor rails comprises a top and a holding area and wherein each of said conductor rails comprises an electrically conducting material.

3. The electrical box according to claim 1 further comprising three channels and three rails for receiving positive, negative, and ground wires.

4. The electrical box according to claim 1 further comprising means for receiving an electrical switch.

5. The electrical box according to claim 1 further comprising means for receiving an electrical receptacle.

6. The electrical box according to claim 1 wherein at least one of said conductor rails comprises a first rail section and a second rail section not electrically connected.

7. The electrical box according to claim 1 further comprising a jump tab disposed in at least one of said conductor rails.

8. The electrical box according to claim 1 wherein the box frame defines wire cutaway holes.

9. A quick connect electrical box assembly for attachment to a construction member comprising:

a box frame defining four sides and wire cutaway holes and a first snap connector;

a box back having a perimeter for adjoining the box frame walls and a second snap connector configured to attach to the first snap connector so as to form an electrical box assembly;

means for attaching the box frame to the construction member wherein the means for attaching are affixed to the box frame;

a plurality of channels configured in the box back;

a conductor rail disposed in each of the channels wherein the conductor rail comprises a top and a holding area; and a plurality of electrical wires having a portion covered with insulation and a bare wire portion, the wires passing through the cutaway holes and disposed within the holding area of each of the conductor rails.

10. The quick connect electrical box assembly according to claim 9 comprising three channels and three conductor rails.

11. The quick connect electrical box assembly according to claim 9 wherein at least one of said conductor rails comprises a first rail section and a second rail section not electrically connected.

12. The quick connect electrical box assembly according to claim 9 further comprising at least one jump tab disposed in one of said conductor rails.

13. The quick connect electrical box assembly according to claim 9 wherein the means for attaching the box frame to the construction member comprises a nail guide.

14. The quick connect electrical box assembly according to claim 9 further comprising an electrical switch, having a plurality of prongs attached to the switch, the prongs configured so as to securely fit within the conductor rails, and the electrical switch attached to the conductor rails.

15. The quick connect electrical box assembly according to claim 14 wherein the switch comprises three prongs carrying a positive wire, negative wire, and ground wire.

16. The quick connect electrical box assembly according to claim 15 further comprising a screw connecting each of said prongs to the switch.

17. The quick connect electrical box assembly according to claim 16 wherein the switch comprises a face plate and wherein the face plate substantially aligns with a top edge of the box frame when the prongs of the switch are fully connected to the rails in the box back.

18. An assembly for connecting electrical cables comprising:

a first length of three strand cable having a positive wire, a neutral wire, and a ground wire, and each of the positive wire, neutral wire, and ground wire having an insulated portion and a bare portion;

a transfer electrical box having a box back having a perimeter for adjoining box frame walls and a box frame, and the transfer electrical box having three channels positioned on a back of the transfer electrical box, and a conducting rail disposed in each of said channels;

wherein an exposed positive wire from the first length of three strand cable is secured in a first rail of the transfer electrical box, an exposed neutral wire from the first length of three strand cable is secured in a second rail of the transfer electrical box, and an exposed ground wire from the three strand cable is secured in a third rail of the transfer electrical box;

a second length of four strand cable having a first end and a second end, and having a first positive wire, a second positive wire, a neutral wire, and a ground wire;

wherein an exposed first end of the first positive wire of the second length of four strand cable is disposed within the same conducting rail that the exposed positive wire from the first length of three strand cable is disposed;

wherein an exposed first end of the second positive wire of the second length of four strand wire is disposed within the same conducting rail that the exposed positive wire from the first length of three strand cable is disposed;

wherein an exposed first end of the neutral wire of the second length of four strand cable is disposed within the same conducting rail that the exposed neutral wire from the first length of three strand cable is disposed;

wherein an exposed first end of the ground wire from the second length of four strand cable is disposed within the same conducting rail that the exposed ground wire from the first length of three strand cable is disposed;

a terminal electrical box having a box back having a perimeter for adjoining box frame walls connected to a box frame, and the terminal electrical box having three channels with three conducting rails positioned in the box back;

wherein an exposed second end of the first positive wire of the second length of four strand cable and an exposed second end of the second positive wire of the second length of four strand cable are disposed in a first conducting rail of the terminal electrical box;

wherein an exposed second end of the neutral wire of the second length of four strand cable is disposed within a second conducting rail of the terminal electrical box;

wherein an exposed second end of the ground wire of the second length of four strand cable is disposed within a third conducting rail of the terminal electrical box; and such that the first rail of the transfer electrical box is in electrical communication with the first conducting rail of the terminal electrical box, the second rail of the transfer electrical box is in electrical communication with the second conducting rail of the terminal electrical box, and the third rail of the transfer electrical box is in electrical communication with the third conducting rail of the terminal electrical box.

19. The assembly according to claim 18 wherein each conducting rail comprises a top and a holding area and wherein each exposed wire is confined within the holding area.

20. The assembly according to claim 18 wherein power applied to the first positive wire of the first length of three strand cable is transferred to the first conducting rail of the terminal electrical box.

21. A rail block for forming electrical connections positioned within an electrical box using a support, said rail block comprising:

a rail surface;

the support connected to and supporting the rail surface within the electrical box;

at least one channel configured within the rail surface;

a conductor rail positioned within the channel; and at least one friction connector connected to the conductor rail, the friction connector configured to receive a bare wire.

22. The rail block according to claim 21 further comprising three channels having three conductor rails.

23. The rail block according to claim 21 having at least two friction connectors connected to said conductor rail.

24. The rail block according to claim 21 further comprising a finger recess.

25. The rail block according to claim 21 wherein the support comprises legs.

26. The rail block according to claim 21 wherein the support comprises a honeycomb structure.

* * * * *

UNITED STATES PATENT AND TRADEMARK OFFICE
CERTIFICATE OF CORRECTION

PATENT NO. : 7,572,976 B1
APPLICATION NO. : 12/069154
DATED : August 11, 2009
INVENTOR(S) : Victor Merrill It is certified that error appears in the above-identified patent and that said Letters Patent is hereby corrected as shown below:

In column 1, lines 28 to 29, the term “wire nuts” should be replaced with -- twist-on wire connector caps --.

In column 1, line 32, the term “wire nut” should be replaced with -- twist-on wire connector cap --.

Signed and Sealed this

Sixth Day of October, 2009

David J. Kappos

David J. Kappos
*Director of the United States Patent and Trademark Office*